(12) United States Patent
Lu et al.

(10) Patent No.: US 8,238,124 B2
(45) Date of Patent: Aug. 7, 2012

(54) DUAL-MODE CONSTANT LOAD CONTROL CIRCUITS AND ASSOCIATED METHODS

(75) Inventors: Huanyu Lu, Hangzhou (CN); En Li, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 371 days.

(21) Appl. No.: 12/633,983

(22) Filed: Dec. 9, 2009

(65) Prior Publication Data

US 2010/0302813 A1    Dec. 2, 2010

(30) Foreign Application Priority Data

May 27, 2009  (CN) .......................... 2009 1 0059444

(51) Int. Cl.
*H02M 3/335* (2006.01)

(52) U.S. Cl. ................... 363/21.15; 363/21.08

(58) Field of Classification Search ............... 363/21.15, 363/21.13, 21.05, 21.07, 21.08, 21.16
See application file for complete search history.

(56) References Cited

U.S. PATENT DOCUMENTS

| 6,674,272 B2 | 1/2004 | Hwang | |
| 7,804,305 B2 * | 9/2010 | Matthews et al. | 324/658 |

* cited by examiner

*Primary Examiner* — Shawn Riley
(74) *Attorney, Agent, or Firm* — Perkins Coie LLP

(57) ABSTRACT

Dual-mode AC/DC power converters and associated methods of operation are disclosed herein. In one embodiment, the AC/DC converter includes a primary winding, a switching transistor coupled to the primary winding, the switching transistor configured to carry a drain-source current, and a feedback voltage port configured to carry a feedback voltage. The feedback voltage port is coupled to the switching transistor to switch off the switching transistor when the drain-source current reaches a peak current limit. The peak current limit increases with increasing feedback voltage if and only if the feedback voltage satisfies an ordered relationship with a threshold.

23 Claims, 5 Drawing Sheets

DUAL-MODE CONSTANT LOAD CONTROL CIRCUITS AND ASSOCIATED METHODS

CROSS-REFERENCE TO RELATED APPLICATION(S)

This application claims priority to Chinese Application No. 200910059444.1, filed on May 27, 2009, the disclosure of which is incorporated herein by reference in its entirety.

TECHNICAL FIELD

The present disclosure is related to electronic circuits, and more particularly, to AC/DC (Alternating Current to Direct Current) power converters.

BACKGROUND

As electronic technology advances, high efficiency and stable operation have become important design considerations. Isolation transformers can be used for adapters, chargers, and/or other systems that require a high level of safety. Such a system can include a primary-side circuit and a secondary-side circuit separated from each other by an isolation transformer.

The operation of the system includes a constant current charging control process and a constant voltage control process. The relationship of the output voltage and output current from the system is illustrated in FIG. 1. During interval B, the load is charged. When the output voltage $V_o$ is less than an output voltage threshold $V_{th}$, the transformer maintains output current $I_o$ at the vicinity of the upper threshold value $I_{th}$ while varying the output voltage $V_o$ to increase the output voltage $V_o$ to the output voltage threshold $V_{th}$. As a result, the control is based on constant current during interval B. During interval A, when the output voltage reaches the output voltage threshold $V_{th}$, the transformer enters a normal operation mode in which the output voltage $V_o$ is maintained while the output current $I_o$ is varied. To achieve constant current control, the current at the output terminals are monitored and the switch on the primary-side is controlled based on the monitored output current in a feedback fashion.

Typically, a current monitoring circuit on the secondary-side is used for current control by obtaining a signal with an optical coupler. However, such an implantation is structurally complex, energy consuming, and inefficient. Other current monitoring circuits that do not utilize the secondary-side monitoring typically utilize complex models based on monitoring input voltage, output diode on duration, and the peak current limit on the primary-side circuit. Accordingly, there is a need for improved control circuits with high efficiency and low structural complexity.

DETAILED DESCRIPTION

This disclosure describes embodiments of AC/DC converters and associated methods of operation. Several of the details set forth below (e.g., example circuits and example values for these circuit components) are provided to describe the following embodiments and methods in a manner sufficient to enable a person skilled in the relevant art to practice, make, and use them. As used herein, a "current source" may mean either a current source or a current sink. Several of the details and advantages described below, however, may not be necessary to practice certain embodiments and methods of the technology. A person of ordinary skill in the relevant art, therefore, will understand that the technology may have other embodiments with additional elements, and/or may have other embodiments without several of the features shown and described below with reference to FIGS. 2-4.

Figure 1:
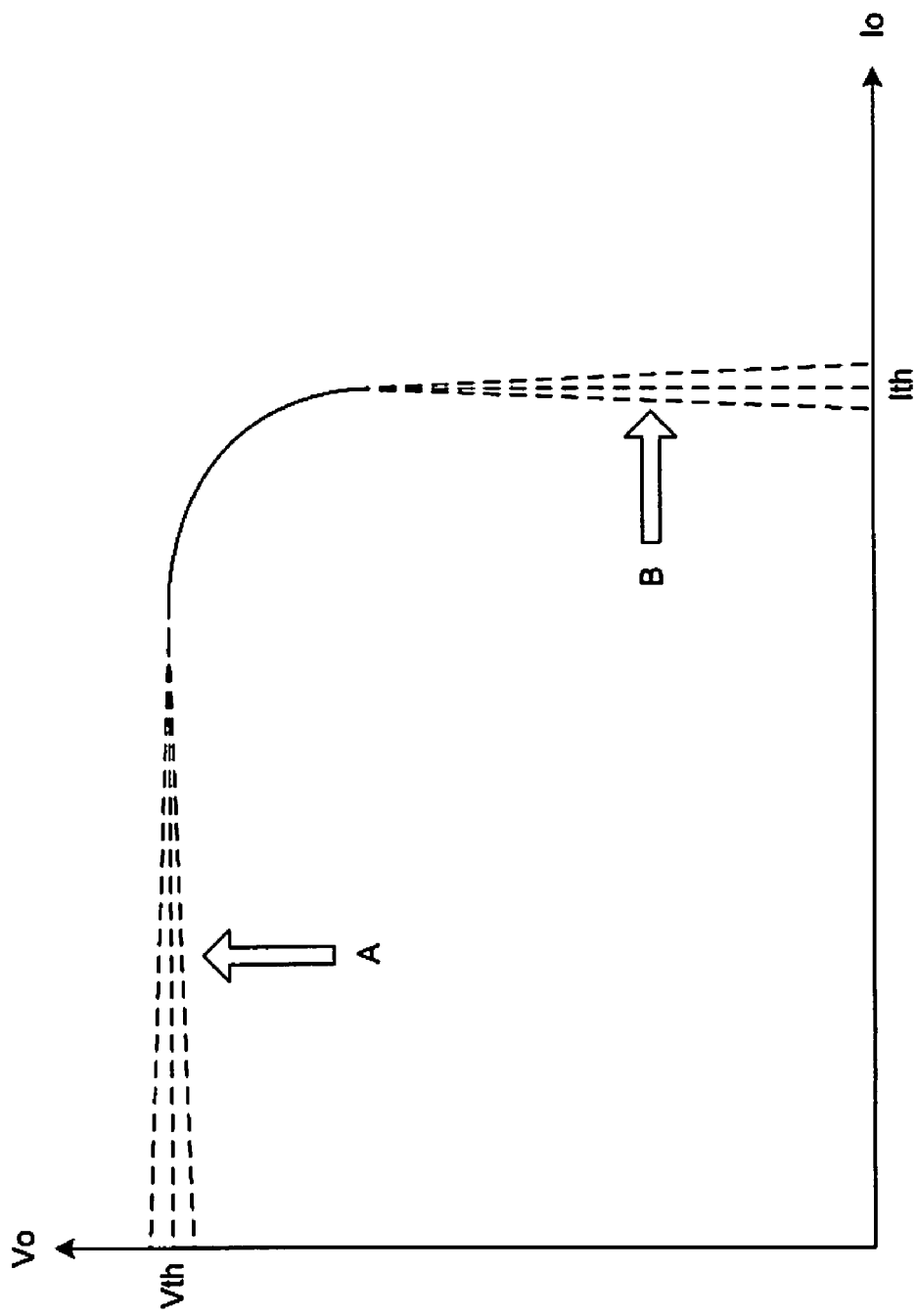
FIG. 1 is an output voltage versus output current plot of an AC/DC converter according to the prior art.
Figure 2:
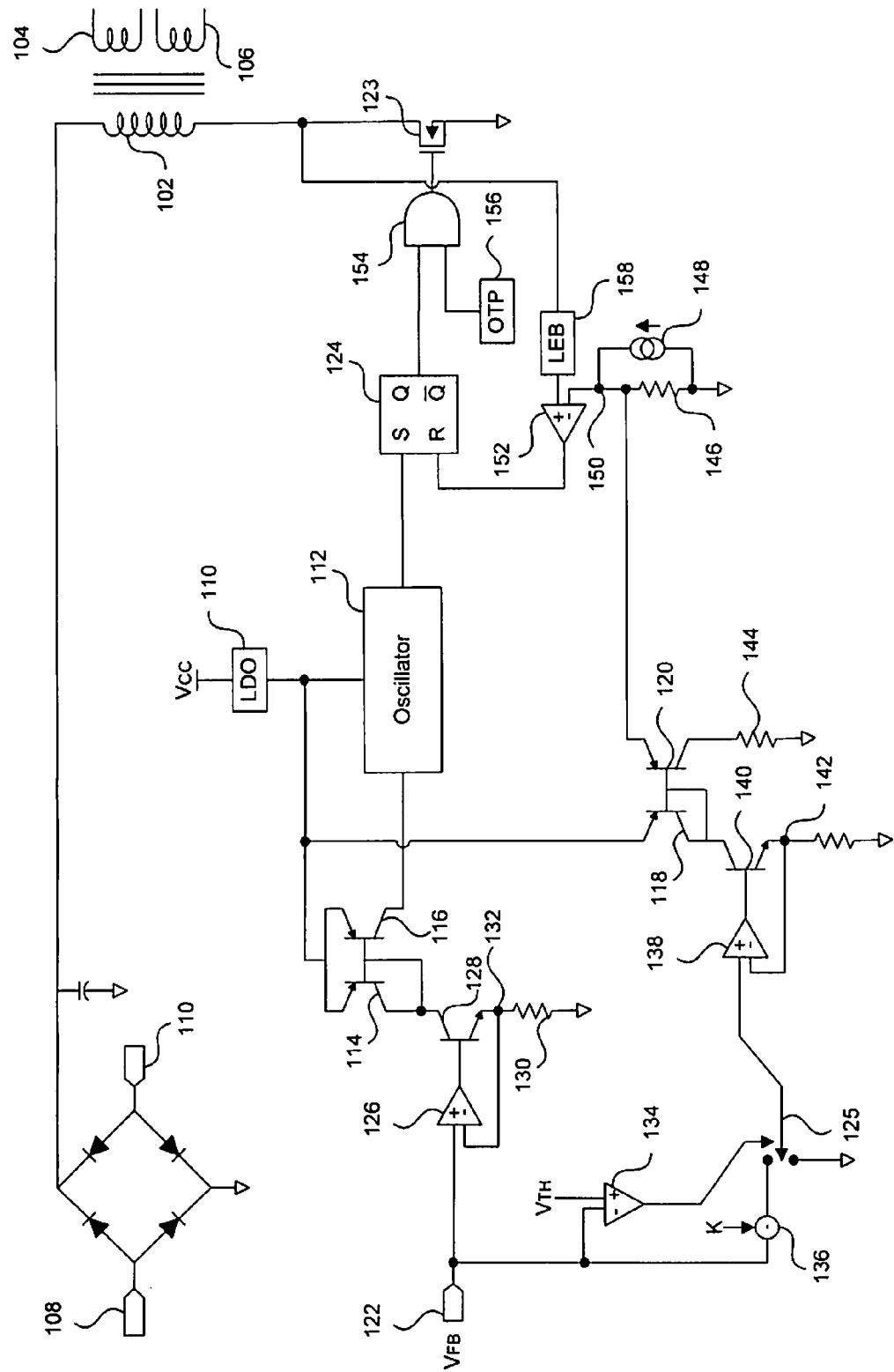
FIG. 2 is a schematic diagram of an AC/DC converter according to embodiments of the present disclosure.

FIG. 2 is a schematic diagram of an AC/DC converter according to embodiments of the present disclosure. Most of the circuit components shown in FIG. 2 may be integrated on a single silicon die. In some embodiments, a transformer external to the silicon die may also be used in the AC/DC power converter. The transformer can include primary winding 102 and one or more secondary windings, for example, secondary windings 104 and 106. In other embodiments, the transformer may comprise additional windings not shown in FIG. 2 as discussed later in more detail with reference to FIG. 4.

As shown in FIG. 2, an input AC signal may be applied to input ports 108 and 110, and an output signal is provided at one of secondary windings 104 or 106 after rectification and filtering. For ease of illustration, not all components in the AC/DC power converter are shown. For example, the AC/DC power converter may also include additional diodes, capacitors, and/or other electrical components at one or both of secondary windings 104 and 106.

Low dropout linear voltage regulator 110 provides a regulated DC voltage to oscillator 112, the emitters of transistors 114 and 116, and the emitter of transistor 118. The transistors 114, 116, and 118 may include a PNP transistor and/or other types of transistors. A feedback signal, having a feedback voltage $V_{FB}$, is provided at input port 122. The feedback signal may be generated by a number of techniques and is indicative of the voltage provided to the load.

One way through which the feedback signal affects the switching of transistor 123 is by changing the frequency of oscillator 112. In the illustrated embodiment in FIG. 2, transistor 123 is an nMOSFET (n-Metal-Oxide-Semiconductor-Field-Effect-Transistor). The output of oscillator 112 is a sequence of pulses, where the feedback signal affects the rate (frequency) at which the pulses are generated. The feedback signal may also affect the switching of transistor 123 by changing the peak current limit and/or other operating parameters, depending upon whether the feedback signal voltage exceeds a threshold. In other embodiments, transistor 123 may also include a JFET, a bi-polar transistor, and/or other suitable types of transistors.

In certain embodiments, the peak current limit is set by the voltage developed at node 150. If the feedback voltage is greater than the threshold (denoted by $V_{TH}$ in FIG. 2) and is the voltage on the positive input port to comparator 134, the arm of switch 125 is connected to ground. As a result, the feedback signal does not affect the peak current limit. If the voltage of the feedback signal is less than $V_{TH}$, the arm of switch 125 is connected to the output of subtraction functional unit 136. As a result, the feedback signal directly affects the peak current limit.

The feedback signal may affect the frequency of oscillator 112 in a variety of manners. For the particular embodiment shown in FIG. 2, the combination of operational amplifier 126, transistor 128, resistor 130, and transistors 114 and 116 sources current to oscillator 112 in response to the feedback voltage $V_{FB}$. This combination of elements may be viewed as a trans-conductance buffer. The operational amplifier 126 biases the base of transistor 128 so that the voltage at node 132 is essentially equal to the feedback voltage. The collector current flowing through transistor 128 is substantially equal to the feedback voltage divided by the resistance of resistor 130 to be proportional to the feedback voltage. This current is mirrored by transistors 114 and 116 into oscillator 112. The current sourced to oscillator 112 may adjust its frequency.

When the feedback voltage is less than the threshold $V_{TH}$, i.e., $V_{FB}<V_{TH}$, comparator 134 sets switch 125 so that its arm is connected to the output of subtraction functional unit 136. Subtraction functional unit 136 provides to the positive (non-inverting) input port of operational amplifier 138 a signal having the voltage $K-V_{FB}$, where K is a suitably chosen constant greater than the threshold $V_{TH}$ so that $K-V_{FB}$ is positive for $V_{FB}<V_{TH}$. Operational amplifier 138 biases the base of transistor 140 so that the voltage at node 142 is substantially equal to $K-V_{FB}$. Accordingly, the collector current flowing through transistor 140 is proportional to the voltage $K-V_{FB}$, and this current is mirrored by transistors 118 and 120 to resistor 144, so that the emitter current in transistor 120 is substantially proportional to $K-V_{FB}$.

The sum of the currents sourced into resistors 144 and 146 is equal to the current sourced by current source 148. As discussed above, the current sourced to resistor 144 is proportional to $K-V_{FB}$ when $V_{FB}<V_{TH}$. For an increase in $V_{FB}$, $K-V_{FB}$ decreases, leading to a decrease in the current sourced into resistor 144, leading to an increase in the current sourced into resistor 146. An increase in the current sourced into resistor 146 leads to an increase in the voltage at node 150, which is connected to the negative (inverting) input port of operational amplifier 152. Consequently, the voltage at node 150 follows that of the feedback voltage because an increase in the feedback voltage leads to an increase in the voltage at node 150, and a decrease in the feedback voltage leads to a decrease in the voltage at node 150, provided that $V_{FB}<V_{TH}$.

As will be described in more detail below, in certain embodiments, the voltage developed at node 150 sets the peak current limit, so that increasing the voltage at the negative input port of operational 152 leads to an increase in the peak current limit for primary winding 102, which leads to an increase in the peak current limit for a load that is coupled to the AC/DC power converter of FIG. 2.

In the illustrated embodiment, the switching of transistor 123 is controlled by the output of AND gate 154. One of the input ports to AND gate 154 is connected to the Q output port of S-R NOR latch 124. Another input port to AND gate 154 is connected to Over Temperature Protection (OTP) functional unit 156, so that the switching of transistor 123 may be disabled if a measured temperature value exceeds some temperature threshold. Although not shown in FIG. 2, AND gate 154 may include additional input ports connected to other functional units, so that any one of these functional units may disable the switching of transistor 123 by providing a low level logic signal to AND gate 154. For purposes of clarity, it is sufficient to assume that all input ports of AND gate 154, other than the one connected to the Q output port of S-R NOR latch 124, are held at a high level logic signal. With this assumption, the switching of transistor 123 is determined by the logic signal provided by the Q output port of S-R NOR latch 124.

Leading Edge Blanking (LEB) functional unit 158 mitigates signal spikes caused by the switching of transistor 123 from affecting operational amplifier 152. When transistor 123 is off, LEB 158 provides a low voltage to the positive input port of operational amplifier 152 so that a low signal is provided to the R input port of S-R NOR latch 124. When transistor 123 is switched on, LEB 158 is off for a very short period of time before becoming active. As a result, the voltage provided to the positive input port of operational amplifier 152 may be expressed by $I_{DS}R_{ON}$, where $I_{DS}$ is the current flowing through transistor 123 when it is switched on (excluding any spikes), and $R_{ON}$ is the on-resistance of transistor 123. Let $V_{DS}$ denote this voltage, so that $V_{DS}=I_{DS}R_{ON}$. Operational amplifier 152 compares $V_{DS}$ to the voltage at node 150, so that a high level logic signal is provided to the R input port of S-R NOR latch 124 when $V^{DS}$ is greater than the voltage at node 150, and a low level logic signal is provided to the R input port of S-R NOR latch 124 when $V_{DS}$ is less than the voltage at node 150. When the feedback voltage is greater than the threshold, $V_{FB}>V_{TH}$, all of the current from current source 148 is sourced into resistor 146, so that the voltage at node 150 is fixed. Thus, the peak current limit is not affected by the feedback voltage.

Figure 3:
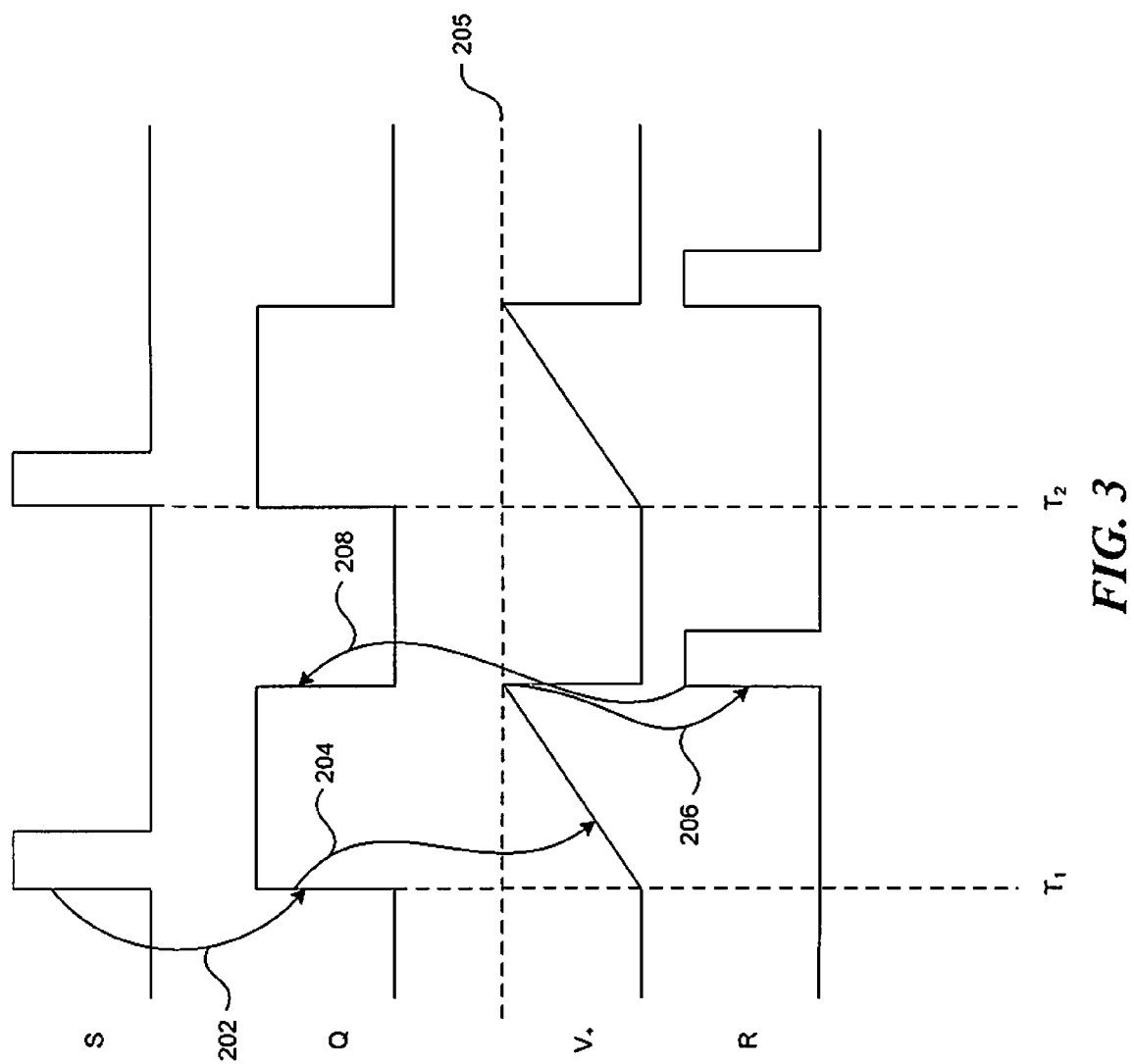
FIG. 3 is a timing diagram illustrating an operation mode of the AC/DC converter in FIG. 2.

FIG. 3 shows four waveforms to illustrate the above description. From the top to bottom in FIG. 3, these waveforms are: The output voltage of oscillator 112 applied to the S input port of S-R NOR latch 124, labeled "S"; the voltage at the Q output port of S-R NOR latch 124, labeled "Q"; the voltage applied to the positive input port of operational amplifier 152, labeled "V+"; and the voltage at the R input port of S-R NOR latch 124, labeled "R". These voltage waveforms are not necessarily drawn to scale, but are drawn to illustrate the relative relationships among them.

At a time just before $T_1$, all voltage waveforms are low. At time $T_1$, the voltage at the S input port changes from low to high, which causes the Q output to rise, as indicated by arrow 202. When the Q output rises, transistor 123 is switched on, raising the voltage $V_+$ applied to the positive input port of operational amplifier 152, as indicated by arrow 204. When the voltage $V_+$ rises to the voltage at node 150, denoted by dashed line 205, operational amplifier 152 outputs a high level logic signal to the R input port of S-R NOR latch 124, as indicated by arrow 206. With a high level logic signal provided to the R input port, the Q output port goes low, causing transistor 123 to switch off, as indicated by arrow 208. The foregoing process repeats itself according to the frequency of oscillator 112, where FIG. 3 shows another cycle of this process beginning again at time $T_2$.

When the feedback voltage is less than the threshold $V_{TH}$, as the feedback voltage at input port 122 increases, the voltage developed at node 150 increases, so that the threshold line 205 in FIG. 3 rises. The voltage $V_+$ reaches the threshold at a later time after $T_1$ for a rising feedback voltage. As a result, a greater amount of current is allowed to flow through transistor 123 when it is switched on before operational amplifier 152 outputs a high level logic signal to the R input port of latch 124. Consequently, the Q output port is high for a longer period of time, and the duty cycle for switching transistor 123 is larger. Thus, the peak current limit for the circuit of FIG. 3 increases as the feedback voltage increases, provided that the feedback voltage is not greater than the threshold provided to the positive input port of comparator 134.

Figure 4:
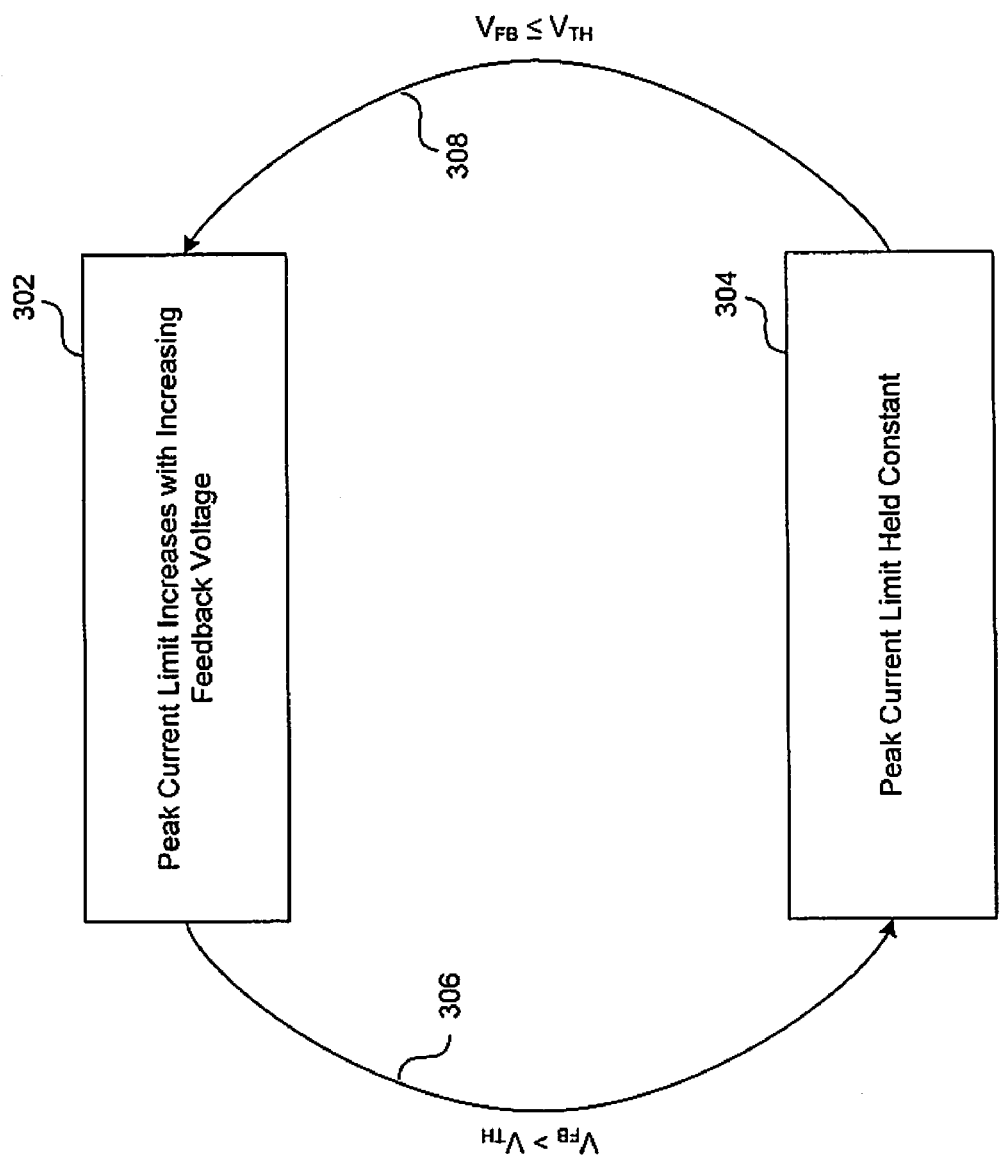
FIG. 4 illustrates a state diagram for the AC/DC converter in FIG. 2 according to embodiments of the present disclosure.

The AC/DC power converter circuit of FIG. 2 may be viewed as a dual-mode circuit, where in a first mode the peak current limit increases as the feedback voltage increases, and in a second mode the peak current limit is not changing as a function of time, as illustrated in the state diagram shown in FIG. 4. As shown in FIG. 4, box 302 denotes the mode (or state) in which the peak current limit increases with increasing feedback voltage, and box 304 denotes the mode (state) in which the peak current limit is held constant. The state changing event for moving from node 302 to 304 is indicated by arrow 306 when the feedback voltage is greater than the threshold. The state changing event for moving from node 304 to 302 is indicated by arrow 308 when the feedback voltage is less than or equal to the threshold.

It should be noted that the particular embodiment illustrated in FIG. 4 may include certain variations. For example, when the feedback voltage is greater than the threshold, the circuit is in mode 304. If the feedback voltage were then to decrease such that it would equal the threshold, then the state (mode) of the circuit may not change even though in theory the event indicated by arrow 308 would be satisfied. Some embodiments may be designed so that the event indicated by arrow 306 occurs when the feedback voltage is greater than or equal to the threshold, and the event indicated by arrow 308 occurs when the feedback voltage is less than the threshold. In practice, the threshold may be changing slightly over time.

For some embodiments, there may be hysteresis, so that the event indicated by arrow 306 occurs when the feedback voltage is greater than a first threshold, and the event indicated by arrow 308 occurs when the feedback voltage is less than a second threshold that is less than the first threshold. When in mode 302, the feedback voltage which is equal to the first threshold may cause the circuit to remain in mode 302 or to transition to mode 304, and when in mode 304, the feedback voltage which is equal to the second threshold may cause the circuit to remain in mode 304 or to transition to mode 302.

Figure 5:
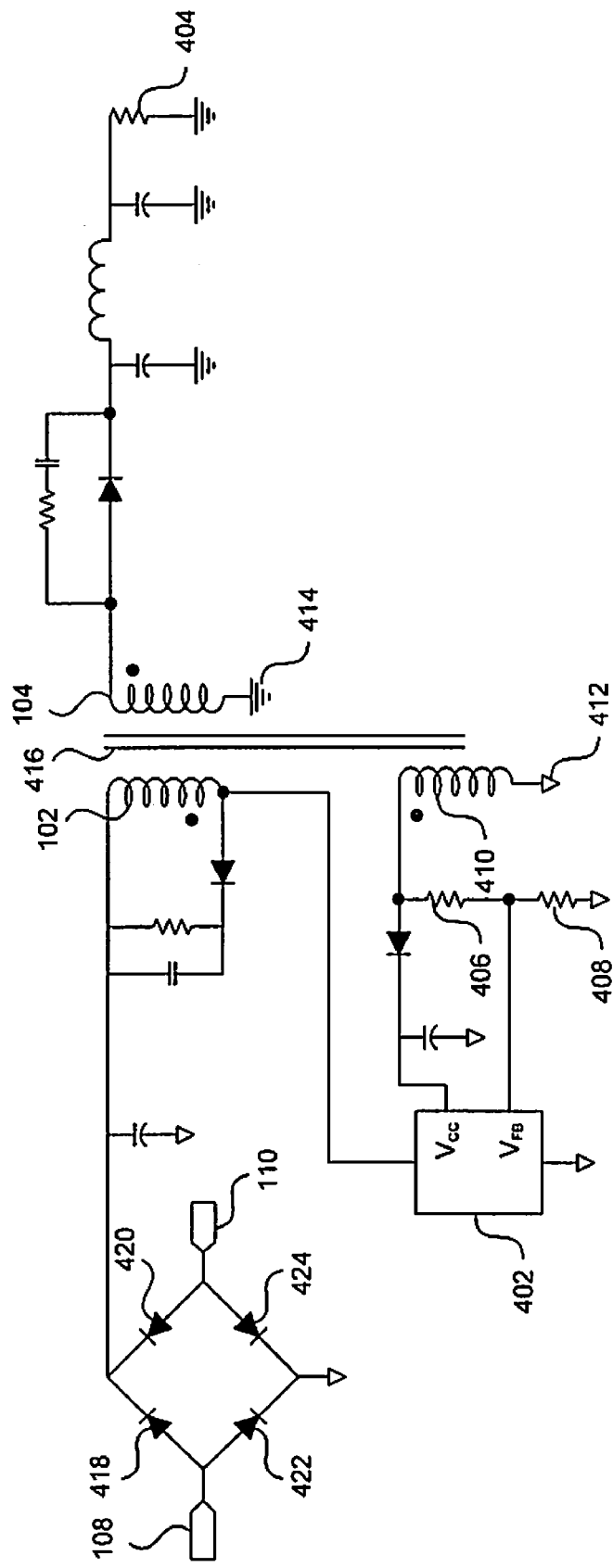
FIG. 5 is a schematic diagram of a system incorporating embodiments of the AC/DC converter in FIG. 2 according to embodiments of the present disclosure.

FIG. 5 is a schematic diagram of a system incorporating embodiments of the AC/DC converter in FIG. 2 according to embodiments of the present disclosure. In FIG. 5, the components of the AC/DC converter in FIG. 2 are encapsulated in functional unit 402. The load is represented by resistor 404. As shown in FIG. 5, the feedback voltage is provided by the resistor divider comprising resistors 406 and 408 coupled to winding 410. Other embodiments may utilize voltage dividers comprising components other than resistors, and other embodiments may take the feedback voltage directly from a winding.

In the particular embodiment of FIG. 5, a transformer is shown comprising windings 102, 104, and 410 wound about core 416. Winding 102 is usually referred to as the primary winding because it is directly coupled to the full-wave rectifier bridge comprising diodes 418, 420, 422, and 424. Although windings 412 and 414 may be referred to as secondary windings because of their mutual coupling with primary winding 102.

Transformer core 416 may be viewed as dividing the circuit schematic illustrated in FIG. 5 into a left-hand region and a right-hand region. The symbol used to designate ground connections on the left-hand side is different from the symbol used to designate ground connections on the right-hand side. As a particular example, the ground connection symbol labeled 412 is different than the symbol used for the ground connection labeled 414. These two different types of ground connections are separate ground systems, so that the ground connections for the left-hand side of the circuit schematic are not electrically connected to the ground connections on the right-hand side of the circuit schematic.

Although it is not necessary to use two ground systems, and some embodiments may indeed have only one ground system so that the ground connections on the left-hand side are also electrically connected to the ground system on the right hand side, there may be some embodiments that utilize two separate ground systems. For example, utilizing two electrically isolated ground systems may satisfy some consumer safety regulations because a consumer device represented by load 404 is electrically isolated from the components on the left-hand side, where some of these components are coupled to a household outlet at a voltage in the range of 110 to 120 VAC, or perhaps in the range of 220 to 240 VAC.

As a result, the left-hand side of the circuit schematic in FIG. 5 may be termed the primary side because primary winding 102 is referenced with respect to the ground system of the left-hand side. The right-hand side of the circuit schematic may be termed the secondary side. Thus, winding 412 is not electrically connected to winding 104, although there may be mutual coupling between the two. The feedback voltage developed by resistor divider comprising resistors 406 and 408 is referenced to the ground system of the primary side. As a result, there is electrical isolation between the left-hand and right-hand sides when two ground systems are utilized.

Various modifications may be made to the foregoing described embodiments. For example, the input to LEB 158 may be connected to the source of transistor 123, which in turn may be connected to a sense resistor that is grounded. For such an embodiment, the voltage provided to the positive input port of operational amplifier 152 is $I_{DS}R$, where R is the resistance of the sense resistor.

It is to be understood in this disclosure that the meaning of "A is connected to B", where for example A or B may be, but are not limited to, a node, a device terminal, or a port, is that A and B are electrically connected to each other by a conductive structure so that for frequencies within the signal bandwidth of interest, the resistance, capacitance, and inductance introduced by the conductive structure may each be neglected. For example, a transmission line (e.g., microstrip), relatively short compared to the signal wavelength of interest, may be designed to introduce a relatively small impedance, so that two devices in electrical contact at each end of the transmission line may be considered to be connected to one another.

It is also to be understood in this disclosure that the meaning of "A is coupled to B" is that either A and B are connected to each other as described above, or that, although A and B may not be connected to each other as described above, there is nevertheless a device or circuit that is connected to both A and B so that a properly defined voltage or current at one of the two elements A or B has some effect on a properly defined voltage or current at the other of the two elements. For example, A may be one port of a microwave structure and B may be a second port of the microwave structure, where the voltages at ports A and B, defined as the transverse electric fields at ports A and B, respectively, are related to each other by a transfer function. Although the microwave structure may introduce a non-negligible impedance, the elements A and B may be considered to be coupled to one another.

From the foregoing, it will be appreciated that specific embodiments of the disclosure have been described herein for purposes of illustration, but that various modifications may be made without deviating from the disclosure. Certain aspects of the disclosure described in the context of particular embodiments may be combined or eliminated in other embodiments. Not all embodiments need necessarily exhibit such advantages to fall within the scope of the disclosure. Accordingly, the disclosure is not limited except as by the appended claims.

We claim:

1. A circuit, comprising:
   a primary winding;
   a switching transistor coupled to the primary winding, the switching transistor being configured to carry a drain-source current; and
   a feedback voltage port configured to carry a feedback voltage, the feedback voltage port being coupled to the switching transistor to switch off the switching transistor when the drain-source current reaches a peak current limit, wherein the peak current limit increases with increasing feedback voltage if and only if the feedback voltage satisfies an ordered relationship with a threshold.

2. The circuit of claim 1, wherein the ordered relationship is satisfied when the feedback voltage is less than the threshold.

3. The circuit of claim 2, wherein the ordered relationship is satisfied if and only if the feedback voltage is less than the threshold.

4. The circuit of claim 1, further comprising:
   a secondary winding magnetically coupled to the primary winding; and
   a voltage divider coupled to the secondary winding to provide the feedback voltage.

5. The circuit of claim 1, the switching transistor having a gate and a drain, the circuit further comprising:
   an S-R NOR latch comprising a Q output port coupled to the gate of the switching transistor, an R input port, and an S input port;
   a leading edge blanker comprising an input port coupled to the drain of the switching transistor, and comprising an output port; and
   a comparator comprising a positive input port coupled to the output port of the leading edge blanker, comprising an output port coupled to the R input port of the S-R NOR latch, and comprising a negative input port.

6. The circuit of claim 5, further comprising:
   an oscillator coupled to the S input port of the S-R NOR latch;
   a resistor connected to the negative input port of the comparator; and
   a current source connected to the resistor, wherein the feedback voltage port is coupled to the resistor so that an increase in the feedback voltage causes an increase in current flowing through the resistor if and only if the feedback voltage satisfies the ordered relationship with the threshold.

7. A circuit, comprising:
   a primary winding;
   a switching transistor coupled to the primary winding, the switching transistor being configured to carry a drain-source current;
   a feedback voltage port configured to carry a feedback voltage;
   a switch coupled to the feedback voltage port;
   an amplifier having an input port coupled to the switch and an output port coupled to the switching transistor; and
   a comparator having a first input port configured to carry a threshold voltage, a second input port coupled to the feedback voltage port, and an output port configured to carry a signal having a first logic state and a second logic state, the output port of the comparator coupled to the switch to couple the input port of the amplifier to the feedback voltage port only if the output port voltage of the comparator is the first logic state;
   wherein the peak current limit increases with increasing feedback voltage if and only if the feedback voltage satisfies an ordered relationship with a threshold.

8. A system, comprising:
   a primary winding;
   a first winding magnetically coupled to the primary winding to provide a feedback voltage;
   a switching transistor coupled to the primary winding, the switching transistor to provide a drain-source current; and
   a feedback port coupled to the first winding, the feedback port being configured to carry the feedback voltage and being coupled to the switching transistor to switch off the switching transistor when the drain-source current reaches a peak current limit, wherein the peak current limit increases with increasing feedback voltage only if the feedback voltage satisfies a first ordered relationship with a first threshold, and wherein the peak current limit is static only if the feedback voltage satisfies a second ordered relationship with a second threshold.

9. The system of claim 8, wherein
   the feedback voltage satisfies the first ordered relationship if the feedback voltage is less than the first threshold; and
   the feedback voltage satisfies the second relationship if the feedback voltage is greater than the second threshold.

10. The system of claim 8, wherein the second threshold is greater than the first threshold.

11. The system of claim 8, further comprising a voltage divider coupled to the first winding to provide the feedback voltage.

12. The system of claim 11, wherein the voltage divider comprising a first resistor and a second resistor.

13. The system of claim 8, further comprising:
    a first ground connected to the first winding;
    a second ground; and
    a third winding magnetically coupled to the primary winding and connected to the second ground.

14. The system of claim 13, wherein the first ground is electrically isolated from the second ground.

15. The system of claim 13, further comprising a voltage divider coupled to the first winding to provide the feedback voltage, the voltage divider connected to the first ground.

16. The system of claim 15, wherein the voltage divider comprising a first resistor and a second resistor.

17. An alternating current to direct current power converter, comprising:
    a primary winding; and
    a first winding magnetically coupled to the primary winding to provide a feedback voltage so that a peak current limit of the alternating current to direct current power converter increases with increasing feedback voltage only if the feedback voltage satisfies a first ordered relationship with a first threshold, and wherein the peak current limit is static only if the feedback voltage satisfies a second ordered relationship with a second threshold.

18. The alternating current to direct current power converter of claim 17, wherein
    the feedback voltage satisfies the first ordered relationship if the feedback voltage is less than the first threshold; and
    the feedback voltage satisfies the second relationship if the feedback voltage is greater than the second threshold.

19. The alternating current to direct current power converter of claim 17, wherein the second threshold is greater than the first threshold.

20. The alternating current to direct current power converter of claim 17, further comprising:
  a first ground connected to the first winding;
  a second ground; and
  a third winding magnetically coupled to the primary winding and connected to the second ground.

21. The system of claim 20, wherein the first ground is electrically isolated from the second ground.

22. The system of claim 20, further comprising a voltage divider coupled to the first winding to provide the feedback voltage, the voltage divider connected to the first ground.

23. The system of claim 22, the voltage divider comprising a first resistor and a second resistor.

* * * * *